UNITED STATES PATENT OFFICE.

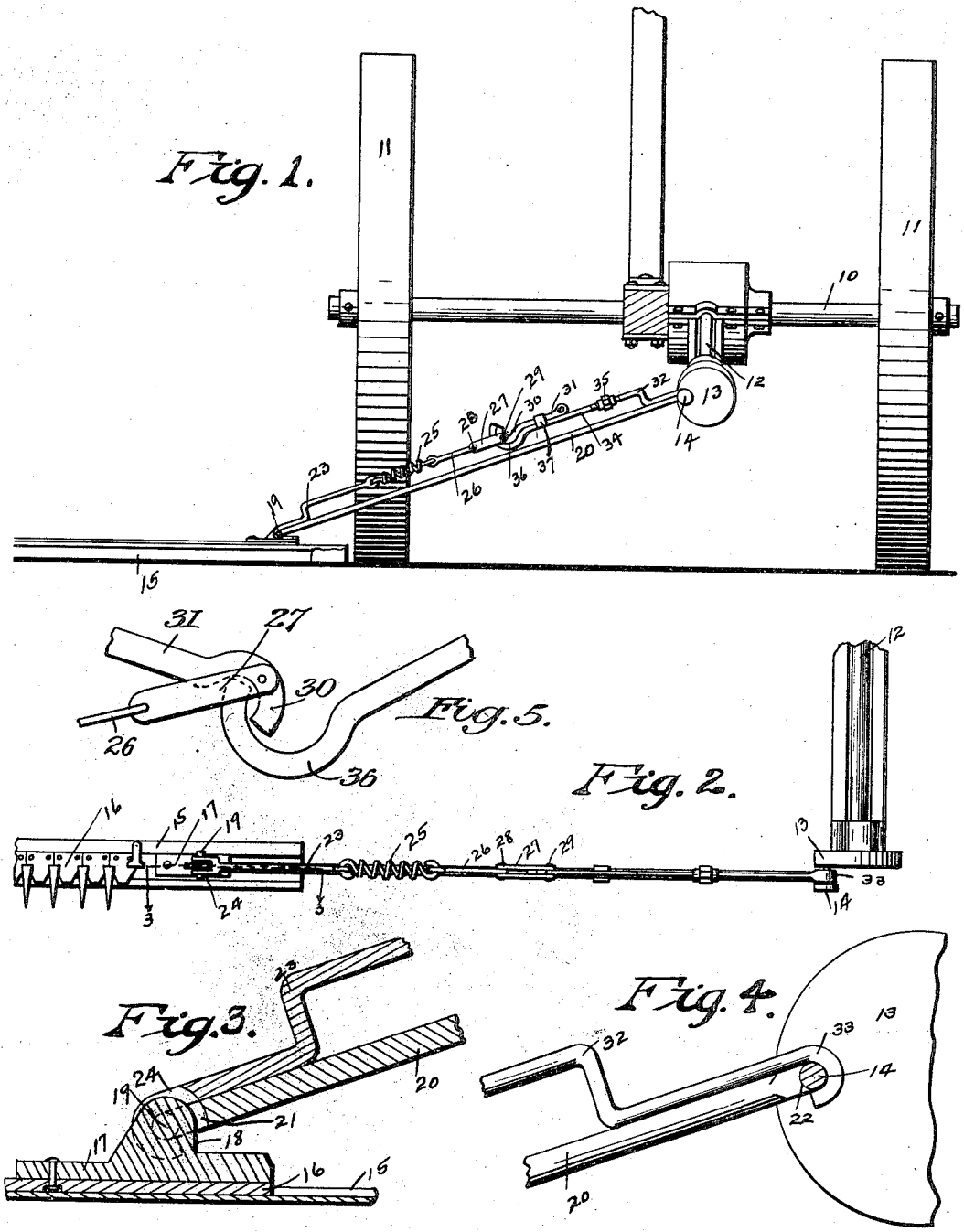

WILLIAM ELERY, OF MENLO, IOWA.

ATTACHMENT FOR MOWING-MACHINES.

1,155,305.   Specification of Letters Patent.   Patented Sept. 28, 1915.

Application filed September 14, 1914. Serial No. 861,731.

*To all whom it may concern:*

Be it known that I, WILLIAM ELERY, a citizen of the United States, residing at Menlo, in the county of Guthrie and State of Iowa, have invented a new and useful Attachment for Mowing-Machines, of which the following is a specification.

The object of my invention is to provide an attachment for mowing machines whereby the pitman for imparting the motion to the sickle may be quickly, easily and securely fastened to the cross-head of the sickle and the wrist-pin of the crank wheel, without the use of tools, bolts or the like.

Still a further object is to provide such an attachment for securing the said pitman as above set forth, in such a manner as to take up all play between the parts at the cross-head and also at the wrist-pin.

Still a further object is to provide such a device that can be quickly and easily removed.

My invention consists in certain details, in the construction, combination and arrangement of the various parts of the device, whereby the objects contemplated are attained, as hereinafter more fully set forth, pointed out in my claims and illustrated in the accompanying drawings, in which—

Figure 1 shows a front elevation of the mowing machine equipped with an attachment embodying my invention. Fig. 2 shows a top or plan view of my improved attachment installed in position. Fig. 3 shows a detail sectional view taken on the line 3—3 of Fig. 2. Fig. 4 shows a detail view of the upper end of the pitman and the device for fastening the same in position. Fig. 5 shows a detail view of the hook and handle for securing the parts together.

In the accompanying drawings I have used the reference numeral 10 to indicate the axle of a mowing machine, on which are the wheels 11.

Suitably mounted is the shaft 12 operated from the wheels 11, carrying the crank wheel 13 on which is a wrist-pin 14.

Suitably mounted is the sickle bar 15, slidably mounted on which is the sickle 16, having a cross-head 17 on which is the lug 18.

Mounted on the lug 18 is a short shaft 19, which extends beyond said lug 18 in opposite directions.

The pitman 20 is placed between the wrist-pin 14 and the shaft 19. One end of the pitman is bifurcated at 21 to receive the two ends of the shaft, and is suitably formed to receive and bear against the shaft 19. The other end of the pitman at 22 is concave to fit against the wrist-pin 14.

For locking the pitman 19 in its position just described as shown in Fig. 1, I have provided the following means: A rod 23 provided with a bifurcated claw or end 24, the members of the bifurcated end 24 being bent around to form hook devices, as shown by the dotted lines in Fig. 3, which devices receive the shaft 19. The rod 23 extends upwardly toward the wrist-pin 14 adjacent to the pitman 20. Secured to the upper end of the rod 23 is a powerful coil spring 25. Secured to the coil spring 25 is a short rod 26, secured to the upper end of which are parallel spaced bars 27 which are pivoted to the rod 26 by means of the pin 28. The upper ends of the plates 27 are pivoted together in their spaced position by means of the pin 29. Pivotally mounted on the pin 29 between the plates 27 is a hook 30 having a handle 31. A rod 32 is provided with a suitable hook member 33 at its end, adapted to receive the wrist-pin 14, and extends downwardly adjacent to the pitman 20. The lower end of the rod 32 is provided with screw threads. Adjacent to the end of the rod 32 is a rod 34, the upper end of which is screw threaded. The screw threads on the rods 32 and 34 are made in opposite directions to receive a turn-buckle nut 35, the opposite ends of which are provided with right and left hand screw threads. The free end of the rod 34 forms a hook 36. The rod 34 is provided with a guiding device 37 to receive the handle 31 in one position of its movement.

In the practical use of my improved attachment the pitman 20 is placed in position with its ends against the pin 19 and the pin 14. The rods 23 and 32 are placed in position receiving the pins 14 and 19, the spring 25 is secured to the rod 23 and the rod 26, the rod 34 is installed in position, the handle 31 is then turned over to position adjacent to the rod 26 until its hook or portion 30 engages the hook portion 36, when the handle 31 is used as a lever to stretch the spring 25 and is turned over until the hook 30 and handle 31 rest in the position shown in Fig. 1. The parts will then be held in this position during the operation of the machine.

It will be understood that the parts 23, 25, 26, 27 and 30 are secured together, and the parts 34, 35, and 32 are secured together so that the device when in actual use is composed of two parts. The attachment may be quickly and easily installed in position or removed therefrom so that it is a simple matter to connect or disconnect the sickle with or from the wheel 13. On account of the fact that the attachment is held in position by the resiliency of the spring 25 the pitman 20 is always held firmly against the pins 14 and 19 and the hook members 33 and 24 are also held firmly in engagement with said pins.

In practically all of the mowers now in use, one objection to the construction employed lies in the fact that the bearings where the sickle cross-head connects with the pitman, and where the said pitman connects with the gearing device such as the wheel 13, allow some play of the parts which on account of the very rapid motion which must be imparted to the sickle, become heated. This difficulty is very largely avoided by my construction hereinbefore set forth, whereby the play between the parts is prevented.

I appreciate the fact that some changes may be made in the details of the construction of my attachment, and it is my intention to cover by this application any such changes in construction which may be included within the scope of my claims.

I claim as my invention:

1. In a device of the class described, two movable members spaced from each other, a pitman received between parts of the respective movable members and bearing against said parts, hook members engaging said parts, and yielding means for connecting said hook members and drawing them together for holding said pitman in its installed position, said means including a hook member connected with one of said first hook members, a second hook member pivotally connected with the other of said first hook members, said pivoted hook member having a handle and being adapted to be swung to position for engaging said third hook member, thus locking the first two hook members together.

2. In a device of the class described, a reciprocating member, a rotating member, a pin fixed off center to said rotating member, a pitman received between said pin and reciprocating member and bearing against said parts, hook members receiving said pin and a portion of said reciprocating member respectively, and means for connecting said hook members and yieldingly drawing them toward each other, said means including a resilient device and means for stretching said resilient device and locking said hook members together.

3. In a device of the class described, two movable members spaced from each other, a pitman received between parts of the respective movable members and bearing against said parts, hook members engaging said parts, and yielding means for connecting said hook members and drawing them together for holding said pitman in its installed position, said means including coacting engaging devices capable in one position of engaging each other and adapted to be moved into position for stretching said yielding means and to be locked in said position.

Des Moines, Iowa, September 3, 1914.

WILLIAM ELERY.

Witnesses:
  E. G. LIGDON,
  R. S. KIRKPATRICK.

Copies of this patent may be obtained for five cents each, by addressing the "Commissioner of Patents, Washington, D. C."